United States Patent
Katinakis et al.

(10) Patent No.: US 6,389,039 B1
(45) Date of Patent: May 14, 2002

(54) ASYNCHRONOUS TRANSFER ON THE CELLULAR RADIO LINK

(75) Inventors: Nikos Katinakis, Stockholm (SE); Akbar Rahman, Brossard; Donald Joong, Montreal, both of (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/177,201

(22) Filed: Oct. 22, 1998

(51) Int. Cl.[7] ................................................ H04J 3/24
(52) U.S. Cl. ........................ 370/474; 370/329; 370/536
(58) Field of Search ................................. 370/329, 330, 370/335, 336, 337, 341, 348, 349, 474, 536

(56) References Cited

U.S. PATENT DOCUMENTS

| | | | |
|---|---|---|---|
| 4,914,651 A | 4/1990 | Lusignan | 370/69.1 |
| 5,526,400 A | 6/1996 | Nguyen | 379/59 |
| 5,570,411 A | 10/1996 | Sicher | 379/57 |
| 5,805,301 A | * 9/1998 | Rasanen | 358/425 |
| 5,920,817 A | * 7/1999 | Umeda et al. | 455/437 |
| 5,956,332 A | * 9/1999 | Rasanen et al. | 370/342 |
| 5,966,374 A | * 10/1999 | Rasanen | 370/337 |

FOREIGN PATENT DOCUMENTS

| | | |
|---|---|---|
| EP | 0421964 A1 | 4/1991 |
| WO | WO97/06647 | 2/1997 |

* cited by examiner

*Primary Examiner*—Hassan Kizou
*Assistant Examiner*—Tim Spafford
(74) *Attorney, Agent, or Firm*—Smith, Danamraj & Youst, P.C.; Sandra Beauchesne

(57) ABSTRACT

A system and method of transferring data to and from a mobile station (MS) in a cellular telecommunications network. When the MS originates a data transmission, the MS simultaneously seizes additional voice channels or control channels from the serving cell or adjacent cells, fills time slots with data packets, and asynchronously transmits the data packets over the plurality of channels in order to increase the data transfer rate. For data calls terminating at the MS, the serving mobile switching center (MSC) reserves a plurality of channels having sufficient signal strength to maintain a connection with the destination MS. The MSC informs the involved base stations that an asynchronous transmission is to be made to the MS. The MSC then assembles the data packets and starts transmission through the involved base stations to the MS over the reserved channels. The MS assembles the packets in numerical order and delevers the data to the user.

26 Claims, 4 Drawing Sheets

ASYNCHRONOUS TRANSFER ON THE CELLULAR RADIO LINK

BACKGROUND OF THE INVENTION

1. Technical Field of the Invention

This invention relates to cellular telecommunication systems and, more particularly, to a method of transferring data to and from a mobile station in a cellular telecommunications network.

2. Description of Related Art

In existing cellular telecommunications networks, each mobile station (MS) is registered with the cellular network through a single base station (BS). In doing so, the MS uses a radio link comprising one Voice Channel (VC) for the transfer of voice and data, and one Control Channel (CC) for the transfer of control signals. Thus, in existing networks, the data transfer rate is limited by the bandwidth of the radio link.

One of the most difficult limitations to overcome in existing cellular systems is the bandwidth limitation of the radio link. The radio link bandwidth generally limits data transfer rates, even when utilizing multi-slot transmission, to approximately 28.8 kbps. Proposed third generation (3G) systems may increase this rate to a range of approximately 100 kbps to 400 kbps. Over short distances, 3G systems may achieve transfer rates as high as 2 Mbps, but this is still much slower than the transfer rate of 100 Mbps which is achievable over a fixed wireline. The higher wireline transfer rate allows users on the Public Switched Telephone Network (PSTN) to enjoy applications such as multimedia and video on demand, whereas cellular subscribers currently have fairly limited access to such applications.

Although there are no known prior art teachings of a solution to the aforementioned deficiency and shortcoming such as that disclosed herein, U.S. Pat. No. 4,914,651 to Lusignan discusses subject matter that bears some relation to matters discussed herein. Lusignan discloses a system for increasing the data transfer rate in an Advanced Mobile Phone System (AMPS) cellular network. In Lusignan, an extra data channel is defined for each voice channel in a cell. The extra data channels are assigned a frequency of 15 KHz higher or lower than the center frequency of the associated voice channel. This frequency assignment minimizes interference with the associated channel frequency and adjacent cells which follow the cellular network frequency reuse plan. However, Lusignan is limited to utilizing whatever channels are available in a single BS, and dramatically increases the load on that BS.

Review of each of the foregoing references reveals no disclosure or suggestion of a system or method such as that described and claimed herein.

In order to overcome the disadvantage of existing solutions, it would be advantageous to have a method of transferring data to and from a mobile station in a cellular telecommunications network which is not limited to available channels in a single BS. Such a method would enable a MS to simultaneously seize additional voice channels or control channels from adjacent cells in order to increase the data transfer rate.

SUMMARY OF THE INVENTION

The present invention is a system and method of transferring data to and from a MS in a cellular telecommunications network. When a data transmission is desired, the MS simultaneously seizes additional voice channels or control channels from adjacent cells and asynchronously transmits packets of data over the plurality of channels in order to increase the data transfer rate. Such a method makes video/multimedia applications possible in the cellular network because, in effect, the radio-link bandwidth increases as many times as there are connections to the MS. For example, a MS connected to three BSs will have roughly three times the bandwidth. If multiple-slot transmissions are utilized on each connection, the data transfer rate increases even more dramatically. In addition, by asynchronously transmitting data packets on a plurality of connections, dedicated connections for data transmissions are not required. This decreases the load on the network by making more efficient usage of network resources.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention is a method of transferring information to and from a MS at a higher rate than is currently possible on the radio link. The method can handle voice or data, and it functions over narrow-band and wide-band technologies. The method is equally applicable to Time Division Multiple Access (TDMA) systems or Code Division Multiple Access (CDMA) systems.

Asynchronous data transfers may be utilized to take advantage of small intervals of inactivity on the radio link, that is, sending bursts of data when no other data is being transmitted. An asynchronous transmission on the radio link in a cellular setting may be implemented in several different ways. In the simplest approach, data is transmitted between the MS and one BS. In more complex situations with increased processing capacity, the present invention transfers data between the MS and multiple BSs.

Because of the high data transfer rates over wireline networks and the Internet, there are an increasing number of applications for such networks in which there is no differentiation between voice and data. For example, voice is transmitted as data in applications such as Phone over the Internet (Voice over IP). The present invention increases cellular data transfer rates to the point that voice can be treated like data over cellular radio links. Thus, cellular networks are provided with data transfer rates fast enough to handle voice asynchronously versus previous limitations requiring that voice connections be dedicated in order to have good voice quality.

Figure 1:
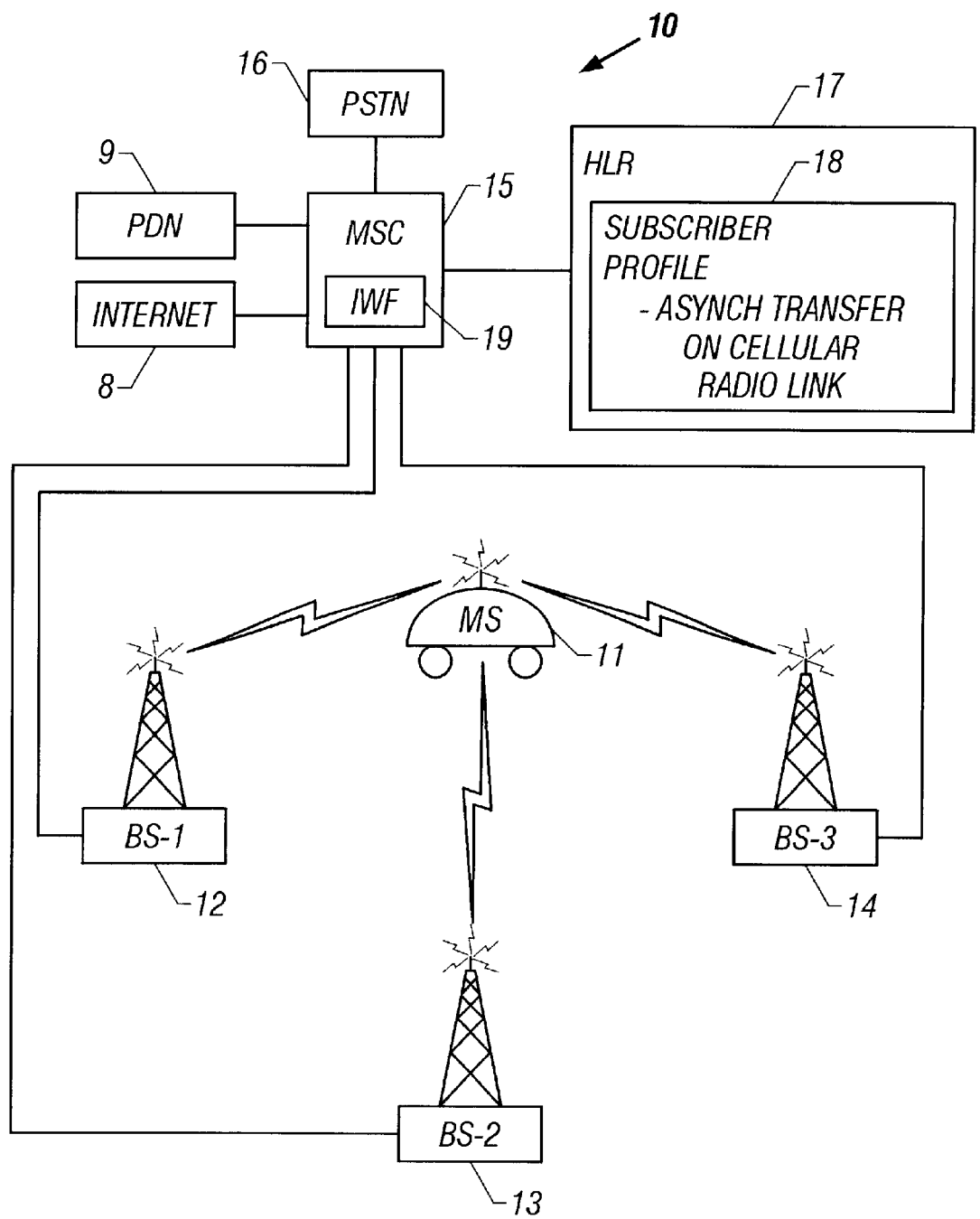
FIG. 1 is an illustrative drawing of a mobile station (MS) operating in a cellular network with multiple base stations (BSs)

FIG. 1 is an illustrative drawing of a mobile station (MS) 11 operating in a cellular network 10 with multiple base stations (BSs) 12–14. For illustrative purposes, three BSs are shown, although the present invention is applicable to cellular networks having from 1 to n different BSs. In addition, the BSs 12–14 may be controlled by a single Mobile Switching Center (MSC) 15 or multiple MSCs. In FIG. 1, BS-1, BS-2, and BS-3 are controlled by MSC 15 which is currently serving the MS 11. The MSC may be connected to an external network such as the Internet 8, a Packet Data Network (PDN) 9, or the Public Switched Telephone Network (PSTN) 16. The MSC is also connected to a Home Location Register (HLR) 17. The HLR contains and administers a subscriber profile 18 with attributes of the mobile station such as its ability to transmit and receive asynchronous data over the cellular radio link. The MSC 15 includes an interworking function (IWF) 19 which repackages data packets from the cellular network 10 into protocols that are suitable and recognizable by various wireline destination networks. Data packets from a MS that are to be delivered to a destination in the PDN 9, for example, are re-packaged in the IWF 19 into PDN protocol or another suitable protocol before delivery to the PDN or other networks.

The MS locks onto three different control channels (for example, one control channel from each BS) or, if the capacity is available, a control channel and up to three different voice channels. The MS may also be assigned a plurality of channels from a single BS. A hybrid mode is also available, in which the MS utilizes one or more voice channels and 2 control channels. The cellular system keeps track only of the voice channel allocation. If the data transfer is taking place over the control channel, then the system only keeps track of whether or not a particular time slot is free. In systems utilizing IS-136, data may be sent over the control channel utilizing the R-DATA message in a manner similar to short message service (SMS) messages.

Transmission from the MS

Figure 2:
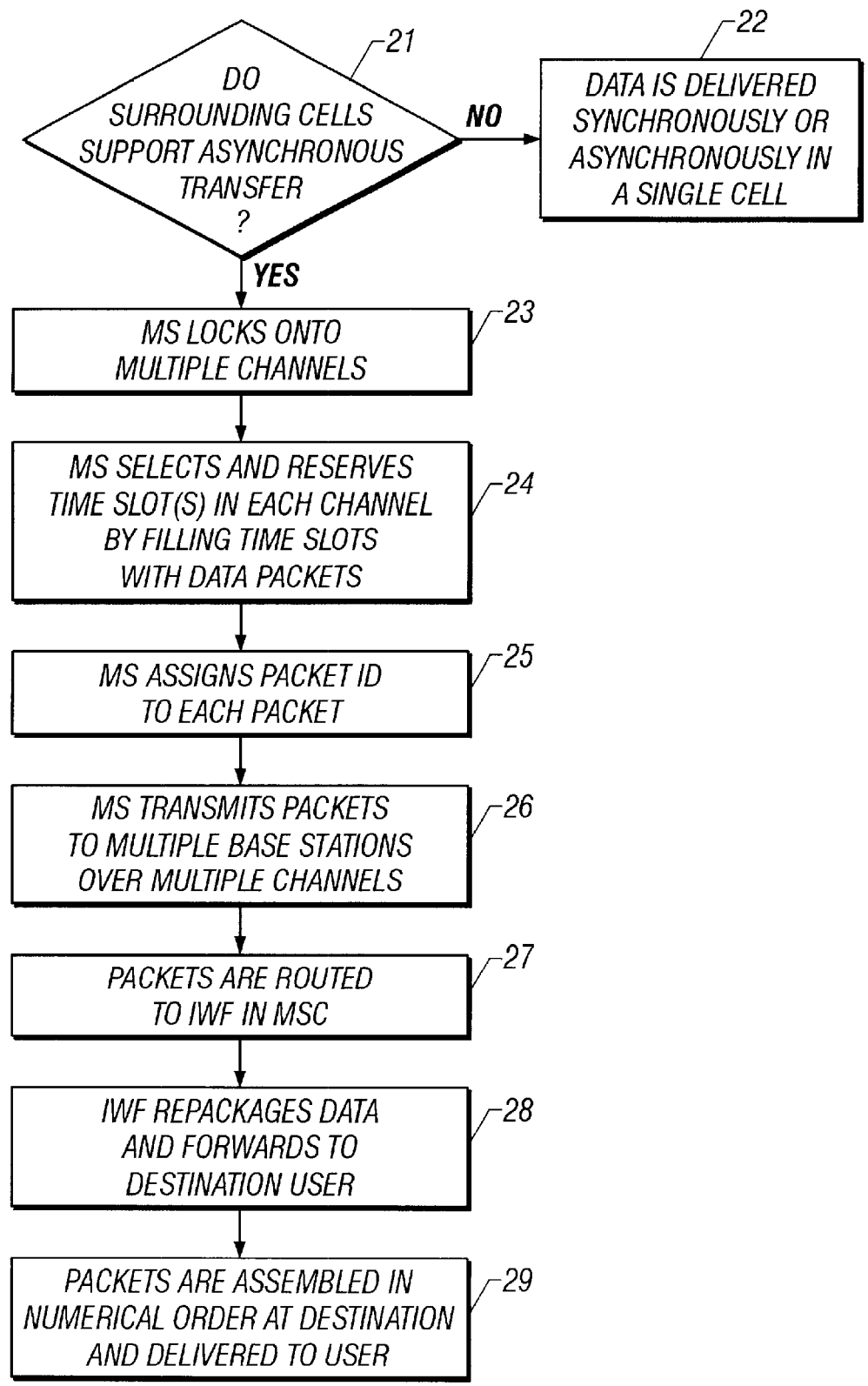
FIG. 2 is a flow chart illustrating the steps of the preferred method of the present invention when transmitting data over a plurality of channels from a mobile station (MS)

FIG. 2 is a flow chart illustrating the steps of the preferred method of the present invention when transmitting data over a plurality of channels from the MS 11. At step 21, the MS scans available channels to determine whether the serving cell or any neighboring cells support asynchronous transfer on the radio link. If not, then the method moves to step 22 where delivery of the data takes place synchronously (or asynchronously in a single cell). If asynchronous transfer on the radio link is supported, the method moves to step 23 where the MS locks onto a plurality of channels. Once the MS is locked on, the MS selects a free time slot in each channel at 24 and reserves it by filling each of the slots with a data packet that is to be transmitted. For higher data rates, the MS may select and reserve multiple time slots in each channel. At 25, the MS then assigns a unique packet ID to each packet. This ID uniquely identifies each data packet, identifies the packet's order among the other packets, and identifies the packet's destination. If the MS is transmitting over a voice channel at the same time, then the data that is sent to the voice channel is also packaged into packets and given packet IDs as well. An important characteristic of the packets is that they are not fixed in length.

At 26, the MS transmits the packets to multiple base stations 12–14 over multiple channels. The packet data arrives at the multiple base stations, and at 27, is then sent over the network to the IWF 19 in the MSC 15. As noted above, addressing information is included in the packet ID. At 28, the IWF repackages the data packets into protocols that are suitable and recognizable by the destination wireline network, and forwards the packets to the destination user. The path used to reach the destination is indifferent, therefore some packets may follow a circuit switched path (adapted to handle data transmissions), while others may be switched through an ATM network. Still other packets may be packed into different packets using the Internet Protocol (IP) for delivery. For circuit switched connections, the IWF may perform firther assembly and ordering, as is known in the art. At the destination, the packets are assembled in numerical order by packet, and the data is delivered to the user via voice, display, or computer, etc. as it becomes available at step 29.

Reception at the MS

Figure 3A:
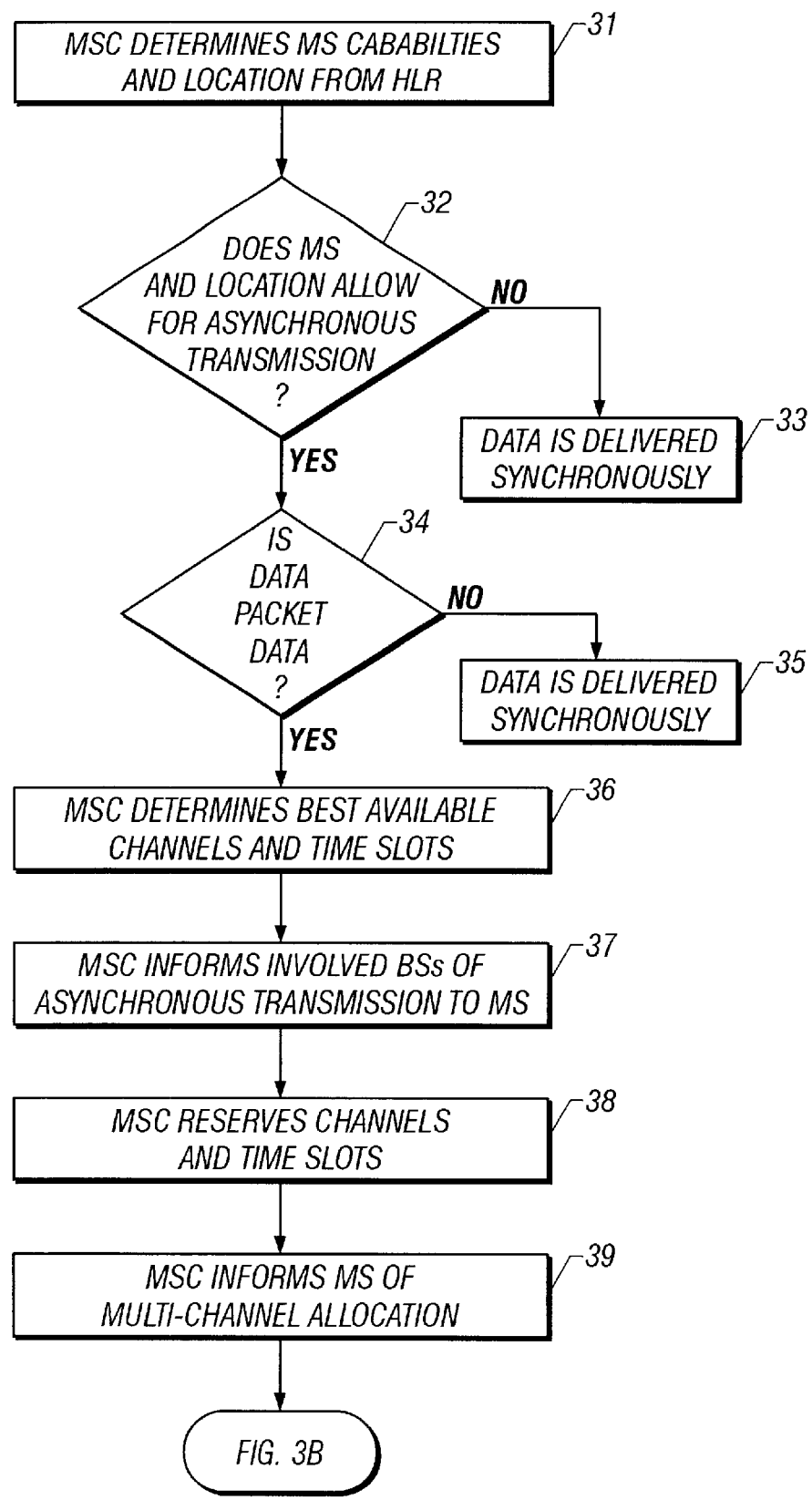
FIGS. 3A and 3B are a flow chart illustrating the steps of the preferred method of the present invention when receiving data over a plurality of channels at a destination MS.
Figure 3B:
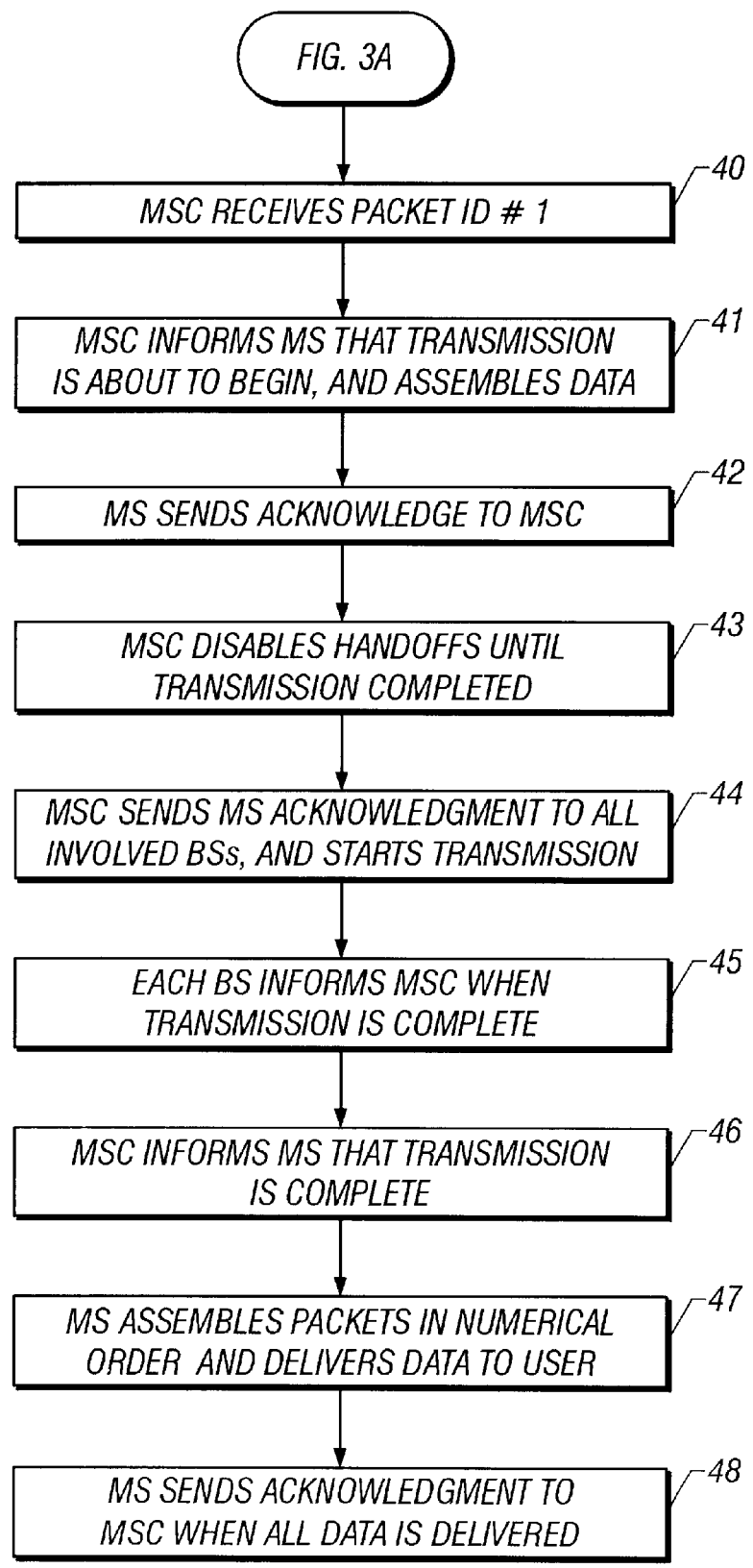

FIGS. 3A and 3B are a flow chart illustrating the steps of the preferred method of the present invention when receiving data over a plurality of channels at a destination MS. Reception of data is handled in three ways: (1) reception of asynchronously transmitted data (for example, data transmitted as described above); (2) reception in an asynchronous mode of packet data not requiring assembly in the IWF; and (3) reception of asynchronously transmitted data in a synchronous manner. Before delivery of the data to the MS 11, the MSC 15 determines at step 31 the location of the receiving MS and its capability to receive data asynchronously in order to determine the mode of transmission. If the MS is capable of receiving data asynchronously, this attribute is stored in the subscriber profile 18 in the relevant HLR 17. The HLR passes this information to the delivering MSC. At step 32, it is determined whether the MS capabilities and the MS location allow for asynchronous transmission. If either the MS capabilities or the location do not allow for asynchronous transmission, then the method moves to step 33 where delivery of the data takes place in a synchronous manner.

If the MS capabilities and the location of the MS allow for asynchronous transmission, the method moves from step 32 to step 34 where it is determined whether or not the data to be transmitted is packet data. If the data is not packet data, the method moves to step 35 where transmission takes place in a synchronous manner. If the data is packet data, then the method moves to step 36 where the serving MSC 15 determines which channels are the best available channels/time slots to assign to the MS based on signal strength measurements. At 37, the MSC informs the BSs 12–14 involved in the transmission that an asynchronous transmission is to be made to the MS, and then reserves the channels and time slots for the transmission at 38. At step 39, the MSC informs the MS of the multi-channel allocation via the control channel.

The method then moves to FIG. 3B, step 40, where the MSC receives the data packet with ID #1 from the IWF 19. At step 41, the MSC informs the MS that transmission is about to begin, and then assembles the data before the delivery starts. Optimization can take place by starting the transmission before all the data has been collected.

At step 42, the MS 11 sends an acknowledgement to the MSC 15. The MSC disables handoffs at step 43 until completion of the data transmission and reception process of the packet. At step 44, the MSC transmits the MS acknowledgement to all involved BSs 12–14, and starts the transmission. At step 45, as each BS completes its transmission, the BS informs the MSC that transmission is complete. When all the BSs finish transmitting, the MSC informs the MS that transmission is complete at 46. At step 47, the MS assembles the data in numerical order by packet, and delivers it to the user via voice, display, or computer, etc. as it becomes available. If the MS receives a packet out of order, it stores the packet in its appropriate place until the gap is filled with the appropriate packets, and then the data is delivered in numerical order to the user. When all the data is delivered, the MS sends an acknowledgment at step 48 to the MSC.

Transmission of Data to the PSTN

Data packets from a MS that are to be delivered to a destination in the PSTN 16 (FIG. 1) or other wireline network are re-packaged in the interworking function 18 in the G-MSC 15 before delivery to the PSTN network. The packaging may be in PDN protocol, Transaction Control Protocol/Internet Protocol (TCP/IP), or any other protocol that is suitable and recognizable by the destination network.

Coexistence with Circuit-switched Transmissions

As described above, the MS is capable of delivering data simultaneously over two networks. Data sent over a circuit switched network is packaged in packets of uniform length, while packets that travel over a packet data network are of variable length. The fact that packet data is being transmitted is transparent to the circuit switched network. The data is broken up at the first available point, typically the gateway MSC for the terminating MS.

Simultaneous Voice and Data Transmission

The asynchronous nature of the data transmission is also ideal as a method of simultaneously transmitting voice and data. While the voice channel handles the voice information, the quiet periods when the speaker does not talk are utilized to transmit data. At the same time, the MS transmit data over the other control channels or voice channels that have been assigned, as described above.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of transferring data from a mobile station (MS) in a cellular telecommunications network to a destination, said method comprising the steps of:

simultaneously seizing, by the MS, a plurality of radio channels, the plurality of radio channels including at least one control channel and a plurality of additional channels from a plurality of base stations in the cellular network;

spreading the data over the plurality of channels; and transmitting the spread data over the plurality of channels to the destination.

2. The method of transferring data from a MS in a cellular telecommunications network of claim 1 wherein the step of simultaneously seizing a plurality of additional channels includes seizing a plurality of voice channels from a plurality of base stations.

3. The method of transferring data from a MS in a cellular telecommunications network of claim 1 wherein the step of simultaneously seizing a plurality of additional channels includes seizing at least one additional control channel and at least one voice channel from a plurality of base stations.

4. The method of transferring data from a MS in a cellular telecommunications network of claim 1 wherein the step of transmitting the data over the plurality of channels to the destination includes the steps of:

packaging the data in a plurality of data packets; and asynchronously transmitting the data packets over the plurality of channels to the destination.

5. The method of transferring data from a MS in a cellular telecommunications network of claim 4 wherein the step of packaging the data in data packets includes assigning a packet identification (ID) to each data packet, the packet ID identifying each packet's numerical order among the plurality of data packets, and identifying the destination.

6. The method of transferring data from a MS in a cellular telecommunications network of claim 4 wherein each of the channels includes a plurality of time slots, and the step of asynchronously transmitting the data packets over the plurality of channels to the destination includes:

selecting at least one time slot in each of the plurality of channels; and filling each selected time slot with one of the data packets.

7. A method of transferring data from a mobile station (MS) in a cellular telecommunications network to a destination, said method comprising the steps of:

simultaneously seizing, by the MS, at least one control channel and a plurality of additional channels from a plurality of base stations in the cellular network;

packaging the data in a plurality of data packets;

spreading the data packets over the plurality of channels;

asynchronously transmitting the data packets over the control channel and the plurality of additional channels to the destination;

assembling the data packets in numerical order at the destination; and delivering to a user.

8. The method of transferring data from a MS in a cellular telecommunications network of claim 7 wherein the destination is a wireline network, and the cellular network includes a gateway mobile switching center (G-MSC) having an interworking function (IWF) that re-packages data transmissions into communications protocols for wireline networks, said step of assembling the data packets in numerical order at the destination including:

assembling the data packets in numerical order at the G-MSC;

re-packaging the data packets in the IWF into a communications protocol suitable for the destination wireline network; and transmitting the assembled data from the G-MSC to the destination wireline network.

9. The method of transferring data from a MS in a cellular telecommunications network of claim 7 wherein the step of asynchronously transmitting the data packets over the control channel and the plurality of additional channels to the destination includes transmitting data packets of uniform length over a circuit switched network.

10. The method of transferring data from a MS in a cellular telecommunications network of claim 7 wherein the step of asynchronously transmitting the data packets over the control channel and the plurality of additional channels to the destination includes transmitting data packets of variable length over a packet data network.

11. A method of simultaneously transmitting voice and data from a mobile station (MS) in a cellular telecommunications network to a destination, said method comprising the steps of:

simultaneously seizing, by the MS, a plurality of radio channels from a plurality of base stations in the cellular network, the channels including a plurality of control channels and at least one voice channel;

packaging the data in a plurality of data packets;

asynchronously transmitting the data packets over the plurality of control channels to the destination while utilizing the voice channel for voice communications;

assembling the data packets in numerical order at the destination; and delivering the data to a user.

12. A system for transferring data from a mobile station (MS) in a cellular telecommunications network to a destination, said cellular network including a mobile switching center (MSC) serving the MS, the system comprising:

means within the MS for simultaneously seizing a plurality of radio channels, the plurality of radio channels including at least one control channel and a plurality of additional channels from a plurality of base stations in the cellular network;

means for spreading the data over the plurality of channels;

means for transmitting the spread data over the plurality of channels from the MS to the MSC; and means for routing the data from the MSC to the destination.

13. The system for transferring data from a MS in a cellular telecommunications network to a destination of claim 12 wherein the plurality of additional channels from a plurality of base stations includes a plurality of voice channels from a plurality of base stations.

14. The system for transferring data from a MS in a cellular telecommunications network to a destination of claim 12 wherein the plurality of additional channels from a plurality of base stations includes at least one additional control channel and at least one voice channel from a plurality of base stations.

15. The system for transferring data from a MS in a cellular telecommunications network to a destination of claim 12 further comprising means for filling time slots in the plurality of channels with a plurality of data packets.

16. The system for transferring data from a MS in a cellular telecommunications network to a destination of claim 15 further comprising means for asynchronously transmitting the plurality of data packets over the plurality of channels to the destination.

17. A method of transferring data to a destination mobile station (MS) in a cellular telecommunications network having a mobile switching center (MSC), a plurality of base stations, and a Home Location Register (HLR), said method comprising the steps of:

reserving by the MSC, a plurality of radio channels suitable for communicating with the destination MS;

assembling a plurality of data packets in the MSC, each of the data packets including a packet identification (ID) which identifies the destination MS and each packet's numerical order among the plurality of data packets;

spreading the data packets over the plurality of channels;

asynchronously transmitting the plurality of data packets from the MSC to the destination MS over the plurality of channels; and assembling the plurality of packets in numerical order in the destination MS.

18. The method of transferring data to a destination MS in a cellular telecommunications network of claim 17 further comprising, before the step of reserving a plurality of radio channels suitable for communicating with the destination MS, the step of determining, by the MSC, whether the destination MS is capable of receiving an asynchronous transmission.

19. The method of transferring data to a destination MS in a cellular telecommunications network of claim 18 wherein the step of determining whether the destination MS is capable of receiving an asynchronous transmission includes querying a database of MS information in the HLR.

20. The method of transferring data to a destination MS in a cellular telecommunications network of claim 19 further comprising the step of synchronously transmitting the plurality of data packets from the MSC to the destination MS upon determining that the destination MS is not capable of receiving an asynchronous transmission.

21. The method of transferring data to a destination MS in a cellular telecommunications network of claim 17 further comprising, before the step of reserving a plurality of radio channels suitable for communicating with the destination MS, the steps of:

determining whether the data is packet data; and synchronously transmitting the plurality of data packets from the MSC to the destination MS upon determining that the data is not packet data.

22. The method of transferring data to a destination MS in a cellular telecommunications network of claim 17 wherein the step of reserving by the MSC, a plurality of radio channels suitable for communicating with the destination MS includes the steps of:

determining by the MSC, a plurality of channels with sufficient signal strength from the destination MS to maintain a radio connection;

informing the base stations which broadcast the determined channels that an asynchronous transmission is to be made to the destination MS; and allocating the determined channels to the transmission within each informed base station.

23. The method of transferring data to a destination MS in a cellular telecommunications network of claim 17 further comprising, before the step of asynchronously transmitting the plurality of data packets from the MSC to the destination MS, the steps of:

receiving a data packet with packet ID #1 in the MSC;

informing the destination MS, by the MSC, that an asynchronous transmission is about to begin;

assembling the plurality of data packets in the MSC; and sending an acknowledgement from the destination MS to the MSC.

24. The method of transferring data to a destination MS in a cellular telecommunications network of claim 17 further comprising, before the step of asynchronously transmitting the plurality of data packets from the plurality of base stations over a plurality of channels to the destination MS, the step of disabling handoffs of the destination MS until the transmission is complete.

25. The method of transferring data to a destination MS in a cellular telecommunications network of claim 17 further comprising, after the step of asynchronously transmitting the plurality of data packets from the plurality of base stations over a plurality of channels to the destination MS, the steps of:

informing the MSC, by each of the plurality of BSs, when transmission of the data packets to the destination MS is complete; and informing the MS, by the MSC, when transmission of the data packets to the destination MS is complete.

26. The method of transferring data to a destination MS in a cellular telecommunications network of claim 17 further comprising, after the step of assembling the plurality of data packets in numerical order in the destination MS, the steps of:

delivering the data to a user; and sending an acknowledgement from the MS to the MSC when all the data is delivered to the user.

\* \* \* \* \*